United States Patent [19]

Sillars

[11] 4,249,692
[45] Feb. 10, 1981

[54] HORN FOR CAN BODY SOLDERING

[75] Inventor: Frederick S. Sillars, Beverly, Mass.

[73] Assignee: USM Corporation, Farmington, Conn.

[21] Appl. No.: 916,201

[22] Filed: Jun. 16, 1978

[51] Int. Cl.³ .............................................. B23K 37/00
[52] U.S. Cl. .................................... 228/15.1; 228/43; 228/44.5; 228/137
[58] Field of Search ........................ 228/15.1, 43, 44.5, 228/36, 37, 47, 136, 137; 198/735

[56] References Cited

U.S. PATENT DOCUMENTS

| | | | |
|---|---|---|---|
| 842,926 | 2/1907 | Walsh | 228/43 |
| 2,597,893 | 5/1952 | Nordquist | 228/43 X |
| 3,000,338 | 9/1961 | Sillars | 228/43 X |
| 3,056,368 | 10/1962 | Sillars | 228/136 |

*Primary Examiner*—Leon Gilden
*Attorney, Agent, or Firm*—Owen J. Meegan; Vincent A. White

[57] ABSTRACT

A more versatile and improved mechanism is provided for internally maintaining can side seams uniformly aligned, for instance as they advance from a forming horn for registration with a molten solder jet or equivalent applicator. In a preferred form an elongated cage-type horn extension comprises circumferentially spaced rods or tubes arranged to progressively deflect successive can bodies thereon radially outwardly from circular to ellipsoidal cross-section. The extension incorporates interchangeable slot formations selectively to accurately guide and accommodate different seam widths. The rods or tubes, when worn from use, may be rotated about their axes to present fresh, unworn surfaces engageable with the can interiors on their side seams. The invention insures uniformity of the soldered side-seam joints and avoids interference with lithography on the can bodies.

12 Claims, 6 Drawing Figures

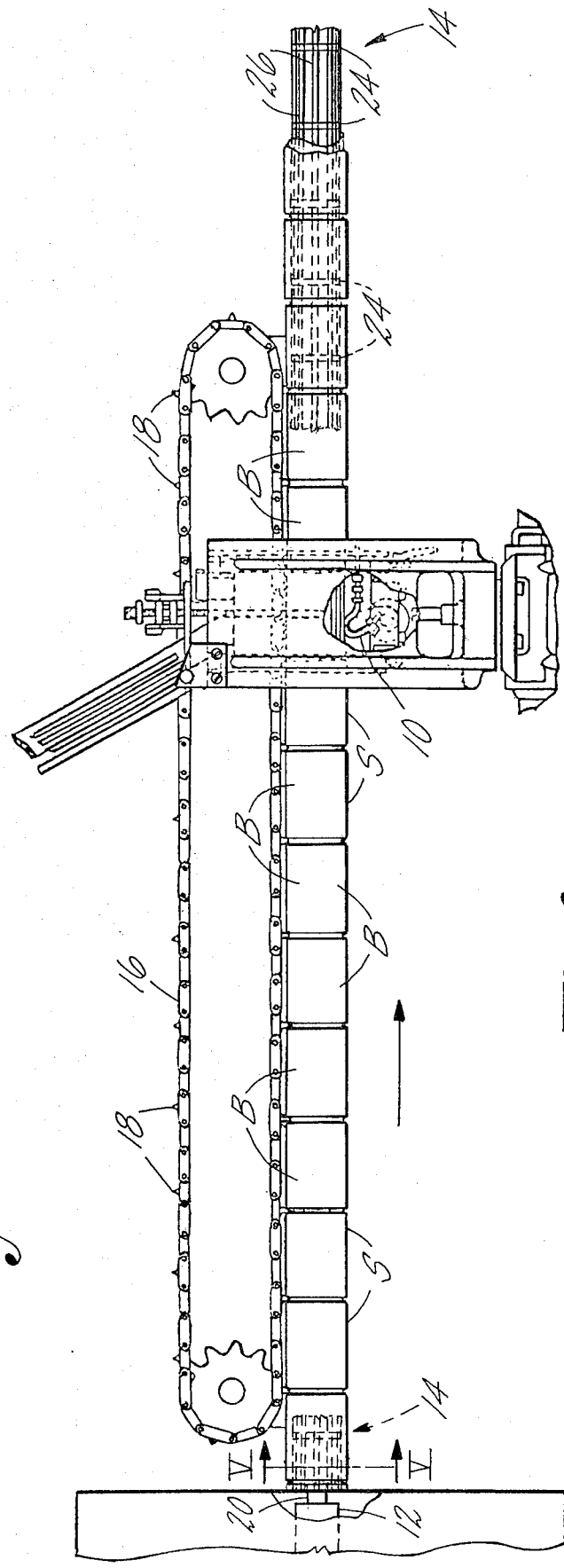

HORN FOR CAN BODY SOLDERING

CROSS-REFERENCE TO RELATED APPLICATION

An application for U.S. Pat. Ser. No. 923,337, filed in my name on July 10, 1978, now U.S. Pat. No. 4202483 pertains to soldering can side seams internally.

BACKGROUND OF THE INVENTION

This invention pertains to can bodymaking, and especially to machines for side-seam soldering.

In view of the increased costs of tin plate, solder, and can-making labor, manufacturers are seeking to reduce the already low losses due to spoilage. One serious problem in connection with the side-seam soldering practice presently prevailing is that the can bodies when formed with side-seams to be soldered are not positively maintained in proper uniform orientation. This is to say that at production rates of 500/ minute or so, as the bodies progress in currently available soldering machines (for instance of the type disclosed in U.S. Pat. No. 3,000,338), the interlocking side lap joints or seams of the bodies commonly passing from a stub horn to a solder applicator and thence to mechanism such as a body end lap depressor chain for minimizing joint thickness, an occasional can body side seam may deviate from alignment and/or orientation about a longitudinal axis. As a consequence weak seams will be produced in the aberrant bodies as a result of solder not being deposited entirely in their side seam openings.

In U.S. Pat. No. 3,056,368 issued in my name, for example, there is disclosed a can body conveying chain and guide members positioned close thereto and externally of the bodies so as to compress the successive circular bodies into elliptoidal cross sections wherein their major axes are generally horizontally disposed. A further approach to maintaining seam alignment integrity in a body-soldering machine while also accommodating variation in can body dimensions is disclosed in U.S. Pat. No. 3,255,856 issued in my name, guide rods being shown therein as having yieldable contact with the exteriors of the bodies. Also, in the prior art it is known to employ expensive ceramic V-guide rails for guiding can bodies, and to use so-called "solder-horses", i.e. a cage-like construction comprising tubes bearing externally on the bodies as they are conveyed. The mentioned variants, so far as known, have not provided a uniformly straight and sufficiently controlled guidance of the can body seams.

SUMMARY OF THE INVENTION

In view of the foregoing, it is an object of this invention to provide, in a can body seam-soldering machine, an improved mechanism for assuring precise alignment of a soldering means and the successive side-seams of the can bodies to be fed thereto.

Another object of this invention is to provide a novel construction in extension of a can body forming horn whereby successive side-seams of the can bodies to be soldered are guided along a predetermined path at least to and through a solder applying zone.

Yet another object of the invention is to provide a versatile mechanism engageable with the internal walls of successive can bodies to determine their path during feeding thereof, the mechanism to impose a gradual conversion of the bodies to elliptoidal section whereby seam misalignment and interference with decoration or lithography on the bodies is avoided.

To these ends, and as herein shown, there is provided for coaxial mounting on, and extension of, a conventional body-forming horn, a stub horn adapted to control exactly the path of the side-seams to be successively soldered. As herein illustrated this stub horn is effective to align the seams with a soldering device by bearing on the internal walls of the successive can bodies at circumferentially spaced localities, one of which is provided with a side-seam receiving groove. The latter is preferably longitudinally disposed in one of a series of spider-supported rods or tubes each of which is mounted to bear radially outward on the inside walls of the cans bodies. While the stub horn construction herein disclosed can, without departing from the scope of this invention, maintain the can bodies continuously in circular cross-section, it is generally preferred that the mounting of the rods or tubes be such that they, by reason of their spaced engagements with the interiors of the can bodies, will impose a gradual conversion in cross-section from circular to a prescribed oval shape wherein the major axes are horizontal and the minor axes intersect the mentioned seam-receiving groove. The primary purpose of imposing ovality on the bodies, as hitherto, is to attain better capillary action in the reduced gap between side seam laps.

In contrast to the prior art externally engageable "cage" rods or tubes which imparted oval shape in the successive can bodies by compression, the internally disposed rods or tubes proposed in this invention are notably longer and hence more gradually effect the elliptoidal sections desired for better insuring that the side-seams are continuously received and not misguided. Advantageously, too, the individual rods or tubes may be adjusted about their respective axes to present fresh unworn can body engaging surfaces and thus increase service life.

BRIEF DESCRIPTION OF THE DRAWINGS

The foregoing and other features of the invention, including various novel details and combinations of parts will now be more fully described in connection with an illustrative embodiment and with reference to the accompanying drawings thereof, in which:

FIG. 1 is a view in side elevation of a can body side-seam soldering machine in which an internal stub horn for guiding can bodies extends from a body forming horn at least to a solder applicator;

FIG. 2. is an enlarged view in side elevation of the stub horn shown in FIG. 1;

FIG. 3 is a left-hand end view of the stub horn;

FIG. 4 is a right-hand end view of the stub horn;

DESCRIPTION OF THE PREFERRED EMBODIMENT

Figure 5:
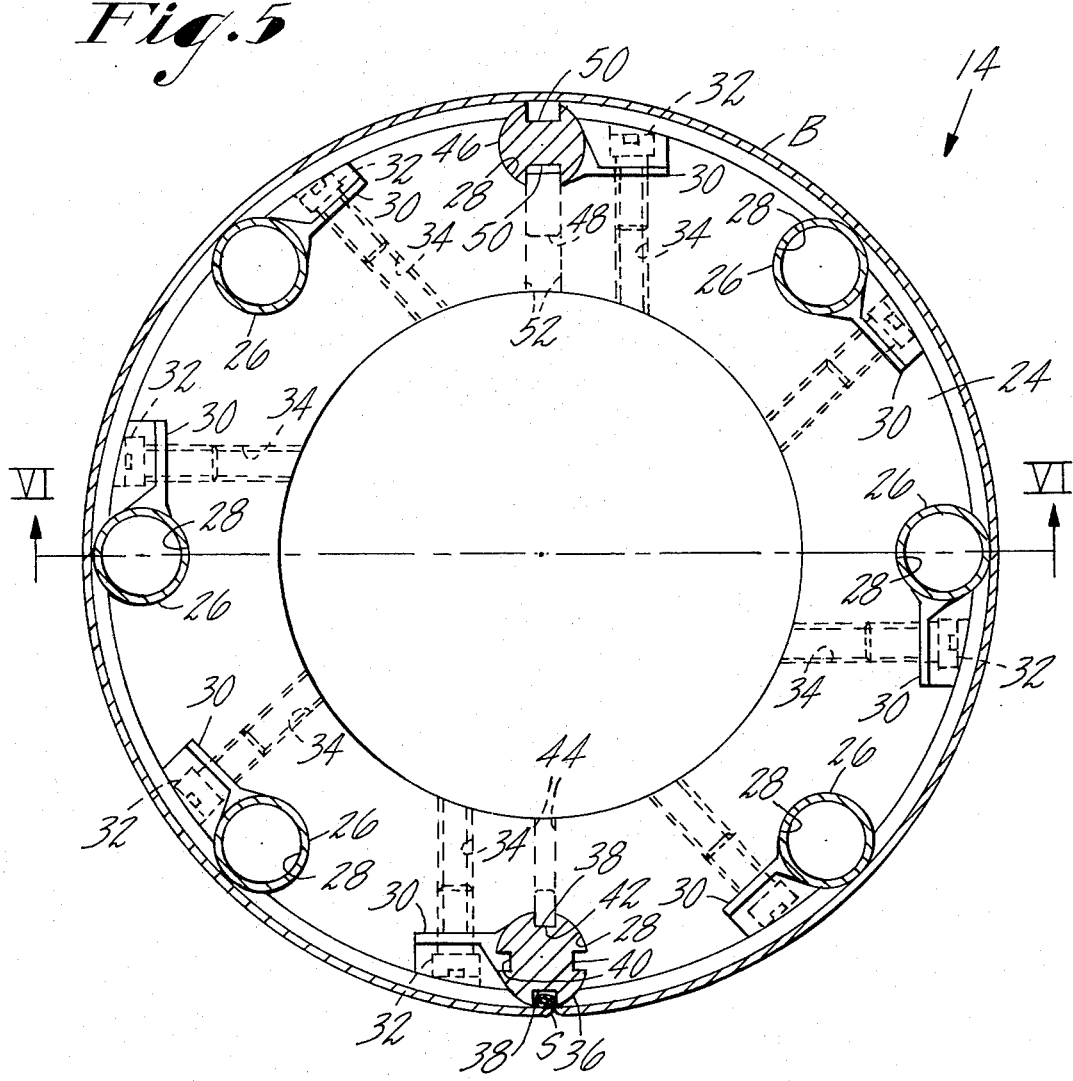
FIG. 5 is a transverse section of the stub horn taken on the line V—V of FIG. 1.

Referring first to FIGS. 1 and 2, can bodies B to be side-seam soldered successively, as by a molten solder applicator nozzle 10 (FIG. 1), or equivalent, are fed from over a conventional body forming horn 12, proceeding from left to right. The bodies are advanced in coaxial alignment over an internal stub horn assembly generally designated 14 and extending from the forming horn 12 to at least the solder applicator 10. Construction of the novel assembly 14 will next be described in detail, it being understood that feeding of the can bodies may be effected by any suitable means, for instance an endless chain 16 having feed dogs 18 respectively engageable with trailing upper can body edges as disclosed in the mentioned U.S. Pat. No. 3,000,338.

An end of the forming horn 12 is reduced in diameter as at 20 (FIG. 1) and constitutes a fixed mounting for receiving a centrally bored disk-like circular plate 22 comprising the left-hand end of the stub horn assembly 14. It will be understood that in principle the internal stub horn could be of solid construction, but in view of the cantilever type support and the longitudinal dimension it must normally extend, its heft and other aspects dictate a tubular and cage-like structure be preferred as will be described. The arrangement eliminates the need for externally disposed, longitudinal guide rails which might interfere with lithography on the can bodies B. It will also be appreciated that, while the cage-like assembly 14 to be described could be circular in cross section throughout its length, the preferred embodiment is circular in its body-receiving end only (FIG. 3) and gradually is gradually is converted to an oval or ellipsoidal cross-section (FIG. 4), the minor axis preferably being vertical, better to insure linear alignment of each joint of side-seams S of the bodies with the stub horn 14 and hence with the nozzle 10.

Figure 6:
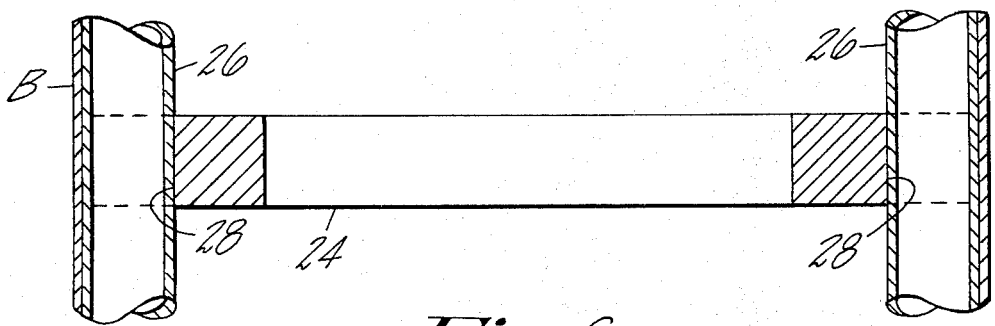
FIG. 6 is a section taken on the line VI—VI of FIG. 5.

The stub horn assembly 14 further comprises a series of longitudinally spaced spiders 24 (FIGS. 5,6). These vary in ovality; their major axes increase, proceeding from left to right as viewed in FIGS. 1 and 2. They are interconnected by means of a plurality of rods or, as in this instance, can body-engaging tubes 26 that extend the length of the assembly. Each spider is fitted with a plurality of circumferentially arranged circular sockets 28 and radially adjustable clamping brackets 30. For this purpose an arm of each bracket is clamped against a cut-away portion of the spider and receives the stem of a cap screw 32 threaded into a radial bore 34 of the spider. Each tube 26 can be adjusted about its axis to compensate for wear due to friction with the bodies B. It will be apparent that an alternate construction could employ circular spiders (not shown) of the smallest mean diameter required and then provide spacing washers to adjust the radial spacing of the tubes 26 at each spider from the longitudinal axis of the assembly. In either case the major diameters of the assembly are preferably horizontal, the seams S being guided as will next be explained, along the lower portion of the minor axes. It will be noted that the outer exposed surfaces of the tubes 26, which radially protrude from the spiders 24, are accordingly in tangential relation to the inside surface of the bodies B as they are fed axially.

Referring again to FIG. 5, at the six o'clock position of the assembly 14, a rod 36 formed with opposite longitudinal pairs of slots 38,38 and 40,40 is secured by brackets 30. The bottom slot 38 is disposed to slidably receive and guide the inner portion of the joints of successive side seams S, the width of the slot matching the joint to maintain the can bodies against rotation or deviation from a path intersecting the solder flow from the applicator 10. A pin 42 may be thrust downwardly into a hole 44 formed in each spider and extends lengthwise in the upper slot 38 thus to prevent rotation of the bottom slot 38 from its seam guiding position. The slots 38 are interchangeable in position for one seam joint width; likewise the slots 40,40 are interchangeable when a wider joint width of seam is to be accommodated. In the event an even wider seam joint is to be guided by the stub horn 14, it may be shifted 180° about its axis and a rod 46 (FIG. 5), secured by pins 48, moved into operating position, one of its two slots 50,50 then slidably receiving and guiding successive internal portions of the can joints. The rod 46 is held in selected angular operating position as by the pins 48 being fitted in a kerf 52 formed in each of the spiders and extending through the inoperative one of the slots 50. The upper slot 50, as seen in FIG. 5, affords clearance for the body drive lugs 18.

In operation of the described side-seam soldering machine, which will now be briefly reviewed, the can bodies B successively pass from the former 12, and the dogs 18 thereupon advance the bodies linearly with their side seams S aligned in six o'clock orientation. To maintain this orientation and thus uniformly expose each seam externally and properly to molten solder from the applicator 10, the inside of each joint is guided in an appropriate one of the slots 38, 40 or 50. For urging the internal portion of the joints to be slidably maintained in the appropriate guide slot 38, 40 or 50, the tubes 26 impose an increasingly more oval cross section (i.e. deviating further from circular) on the bodies as they progress thus tending to shorten their minor axes, and hence both reduces the gap between adjacent body laps for better capillary action and raises the seam joint in is guide slot for the reception of the molten solder.

Although it is acknowledged that prior art cage-like horns have been provided for external engagement with successive can bodies and that such horns have been made ellipsoidal in cross section, it is to be noted that those horns have been relatively short in length. Hence, their relatively abrupt change in cross-sectional shape has actually tended to misalign the side seam joints with the solder applicator or prevent the degree of uniformity in soldering width required for consistently acceptable economical can production. It is found that the more gradual change from circular to oval section as provided by the notably longer stub horn of this invention to insure positive internal guidance of the seam joints, is effective for precise alignment, the stub horn length being such as to simultaneously accommodate not less than, for example, eight or nine of the can bodies B (from the forming horn to the applicator 10) when their height is four inches. This contrasts with the external ovalized stub horn which did not extend to the applicator and did not carry more than five such cans.

The stub horn assembly 14 is illustrated as comprising axially continuous rods and/or tubes 26, but it will be apparent that they may differ in number, individual lengths and circumferential spacing when desired and be supported by a different mounting means if preferred without departing from the scope of this invention. It is of course desirable to preserve symmetry in the cross sectional shape of the assembly in order to distribute the can body bearing loads properly and avoid any drag which might cause the bodies B to become nonuniformly oriented.

The assembly 14 is of low cost, avoids the need for costly ceramic guide bars found in prior external constructions, is easy to maintain and handle, and affords long service life.

I claim

1. In a machine for side-seam soldering can bodies and comprising power means for successively feeding the bodies from a body forming horn in generally coaxial arrangement to a molten solder applicator, the improvement which comprises: an elongated stub horn mounted on the forming horn and extending therefrom adjacent to the feed means at least to the applicator, said stub horn being dimensioned so as to gradually deform the can bodies from a generally circular cross-section to an ellipsoidal cross-section and frictionally engage the inside walls of the cans as they are conveyed, said stub horn also having a substantially continuous longitudinally grooved formation disposed for slidably interfitting with and guiding the joints of the successive body side seams on the can inside walls thus to define the path of the seams with respect to the molten solder to be applied thereto by said applicator.

2. A machine as in claim 1 wherein the stub horn wall-deforming portions are arranged to establish the major axes of the can bodies in one plane, and said interfitting formation includes a groove which lies on their minor axes.

3. A machine as in claim 1 wherein said portions of the tubular stub horn comprise a plurality of axially extending rods and/or tubes, and means for supporting said rods or tubes in circumferentially spaced relation.

4. A machine as in claim 3 wherein said supporting means is a series of axially spaced spiders for peripherally mounting the rods and/or tubes.

5. A machine as in claim 4 wherein at least two of the spiders carry adjustable means for radially positioning the wall engaging portions of the rods and/or tubes to define said body cross sections.

6. A machine as in claim 1 wherein the stub horn comprises said grooved, seam-interfitting formation, the latter being incorporated in a rod supported for rotation about its axis and having more than one size of groove extending longitudinally on its periphery to accommodate, respectively, different widths of body side seams.

7. A machine as in claim 6 wherein the grooved rod is of aluminum oxide.

8. A stub horn for axially and non-rotatably controlling the feeding movement of successive can bodies from a forming horn and at least to a molten solder applicator operable on their side seam joints, the stub horn comprising: a cage-like assembly adapted for mounting on the forming horn and including a plurality of circumferentially disposed members engagable with the inside walls of the successive can bodies, one of said members being formed with a groove for receiving and guiding the successive internal portions of the side-seam joints, the groove being aligned with and extending substantially to the solder applicator, said stub horn having a circular cross-section at the end adapted to be mounted on the forming horn and being configured so as to gradually convert said can bodies from a generally circular cross-section to an ellipsoidal cross-section.

9. A stub horn as in claim 8 wherein tubular support means is provided for mounting the members radially to enable them to gradually impose an elliptiodal cross-section on the bodies as they approach the applicator.

10. A stub horn as in claim 8 wherein said one member is formed with more than one groove and each groove extending longitudinally with a different sectional shape to accommodate, respectively, different correspondingly shaped seam joints.

11. The method of guiding can bodies having internal side seams from a forming horn to at least the molten solder applicator of side seam soldering machine, the method comprising: coaxially constraining the bodies for travel in a row by frictionally engaging them internally, and causing internal portions of their successive seam joints to ride in a linear groove aligned with the applicator, said bodies being cylindrical when relaxed and causing said bodies to deform gradually from said cylindrical shapes into ellipsoidal cross-sections as they travel in a row to the applicator.

12. In a machine for side seam solder can bodies and comprising power means for successively feeding the bodies from a body forming horn in generally coaxial arrangement to a molten solder applicator, the improvement which comprises: an elongated tubular stub horn arranged for internal frictional engagement with the inside walls of the can bodies, said stub horn having wall deforming portions to deform the can bodies radially thus to convert the cross section of said can bodies gradually from a circular to an ellipsoidal shape as they are conveyed on said stub horn, said stub horn being formed of a plurality of the rods and/or tubes peripherally disposed on a series of axially spaced spiders for supporting said rods or tubes circumferentially, at least two of said spiders carrying adjustable means including a clamping mechanism releasably to permit the rotation of the rod or tube gripped thereby about its individual longitudinal axis to change the locality of arrangement of the rod or tube with respect to the can walls, said stub horn being mounted on the forming horn and extending at least to said applicator, and at least one of the rods on the minor axis of the ellipsoidal portion of the stub horn having a substantially continuous longitudinal formation disposed therein for slidably interfitting with and guiding the joints of the successive body side seams on the can insie walls thus to define the path of the seams with respect to the molten solder to be applied thereto by said applicator.

* * * * *